Nov. 1, 1932.     J. A. ARENZ     1,886,240
SCREW CUTTING TOOL
Filed Oct. 18, 1929     4 Sheets-Sheet 2

Inventor
John A. Arenz
By his Attorney John Lynch

Nov. 1, 1932.  J. A. ARENZ  1,886,240
SCREW CUTTING TOOL
Filed Oct. 18, 1929   4 Sheets-Sheet 3

Inventor
John A. Arenz.
By his Attorney
John J. Lynch

Nov. 1, 1932.   J. A. ARENZ   1,886,240
SCREW CUTTING TOOL
Filed Oct. 18, 1929      4 Sheets-Sheet 4

Inventor
John A. Arenz
By his Attorney
John J. Lynch

Patented Nov. 1, 1932

1,886,240

UNITED STATES PATENT OFFICE

JOHN A. ARENZ, OF MOUNT VERNON, NEW YORK, ASSIGNOR TO INTERNATIONAL SCREW CO., OF WILMINGTON, DELAWARE, A CORPORATION OF DELAWARE

SCREW CUTTING TOOL

Application filed October 18, 1929, Serial No. 400,676, and in Canada September 6, 1928.

This invention relates to screw cutting machines and in particular to one employing a double tool for the rapid and efficient production of screws.

It is well known in automatic screw cutting machines that the thread cutting tools are fed and returned along each screw blank several times, at the end of each feed, the cutting edge of the tools are withdrawn from the blanks so that they may be returned for the next cut. Each succeeding cut means that the tools are advanced slightly toward the work so as to increase the depth of the cut. The tool feed and return movements are controlled by suitable cams which are cut to give to the tool carriage, the proper movement in the cutting and retracting operations.

The most important object of my invention, however, is the use of a plurality of adjacent tools which are used to cut a double thread on a screw blank but the tools are so arranged that they operate in the same thread. In machines made heretofore, it has been the practice to provide a plurality of tools, more than two always being employed which perform the threading operation but these tools were invariably divided so that they operated in different threads. My improved tool operates in the same thread, cuts it faster and thereby produces a double thread screw much faster and more efficiently than has heretofore been possible, the reason for this being that the double tool cutting in the one screw groove effectively completes the cut in that groove before starting on the cut of the other groove which forms the double thread screw.

Another and further object of my invention is the provision of a threading machine which is simple and efficient in operation which is cheap to manufacture, which is composed of a minimum number of parts so that efficiency in operation is very materially increased and also one which is particularly adapted to take care of the operation of a double cutting tool.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a view in side elevation of a machine constructed in accordance with my invention.

Figure 1:
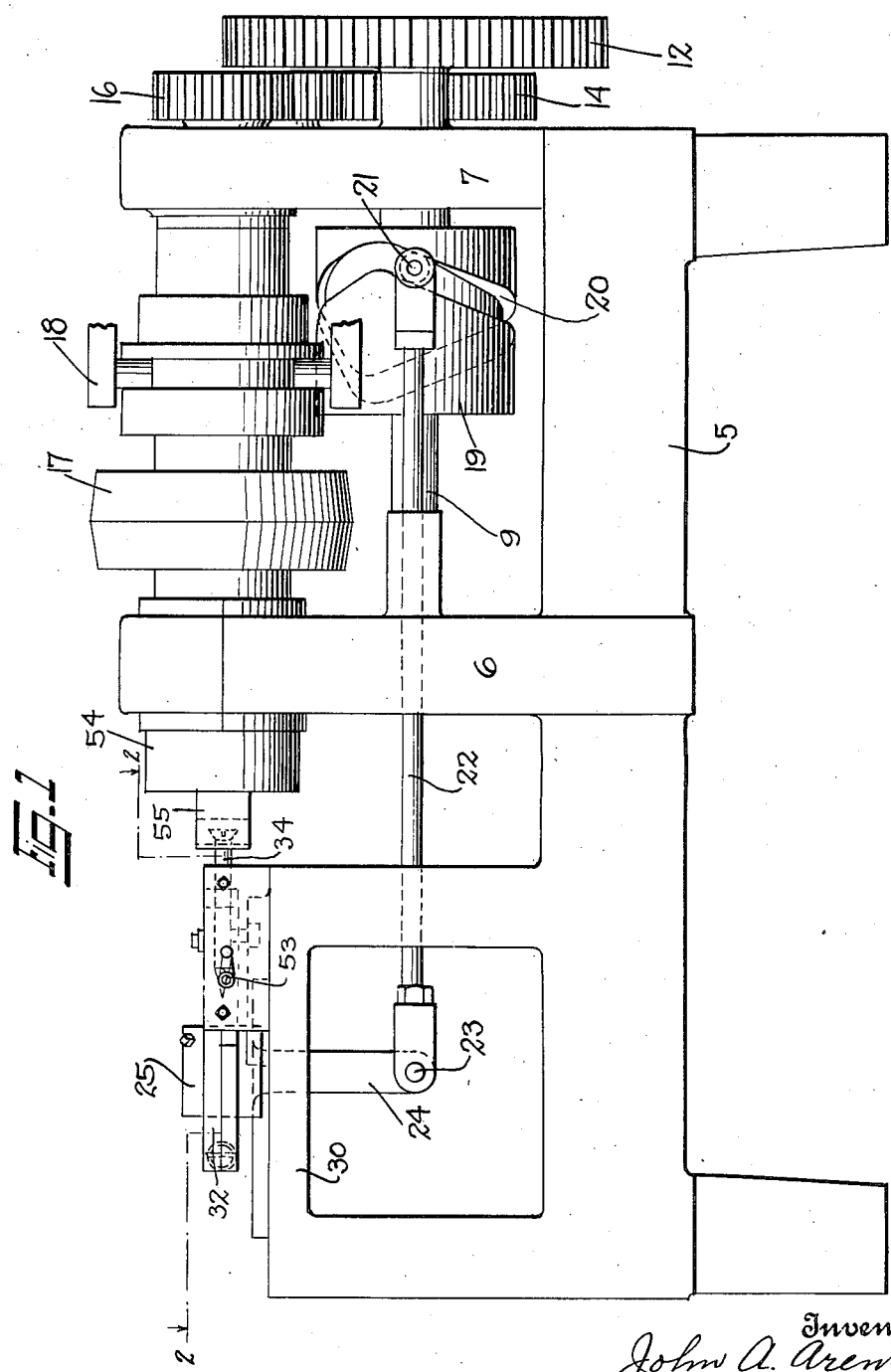
Figure 2:
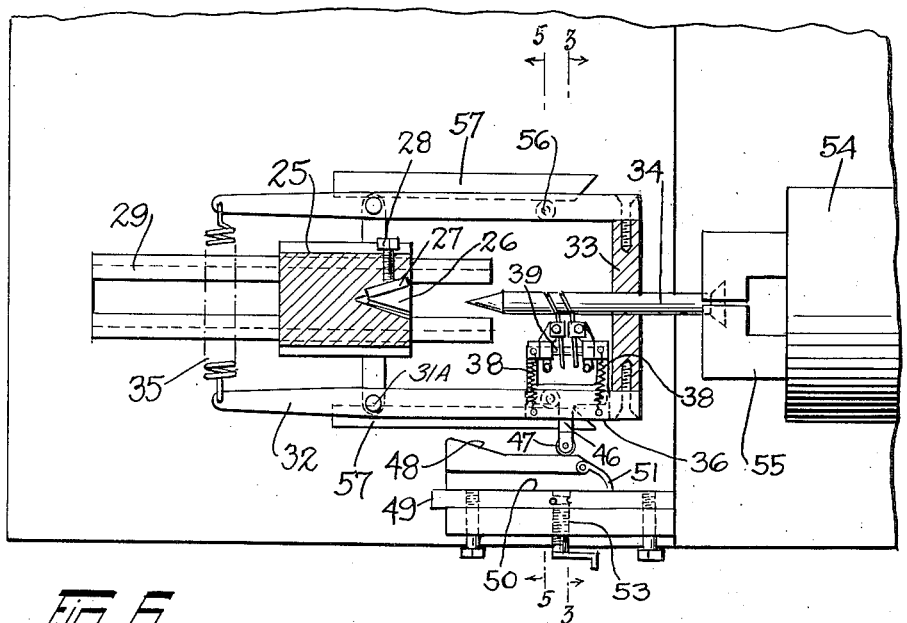
Figure 2 is a top plan view of the front end of the machine illustrating the method of pointing the screw blank and also of threading the same.
Figure 6:
Figure 6 is a view of a screw blank which is operated upon by the machine.
Figure 3:
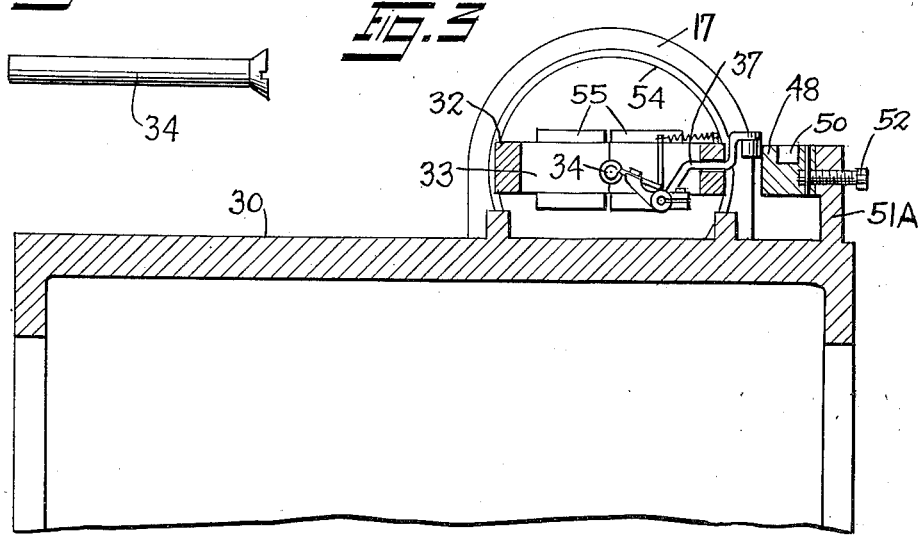
Figure 3 is a section taken on the line 3—3 of Figure 2 and illustrates the position of the tool carriage with respect to its operating cam and the screw blank.
Figure 4:
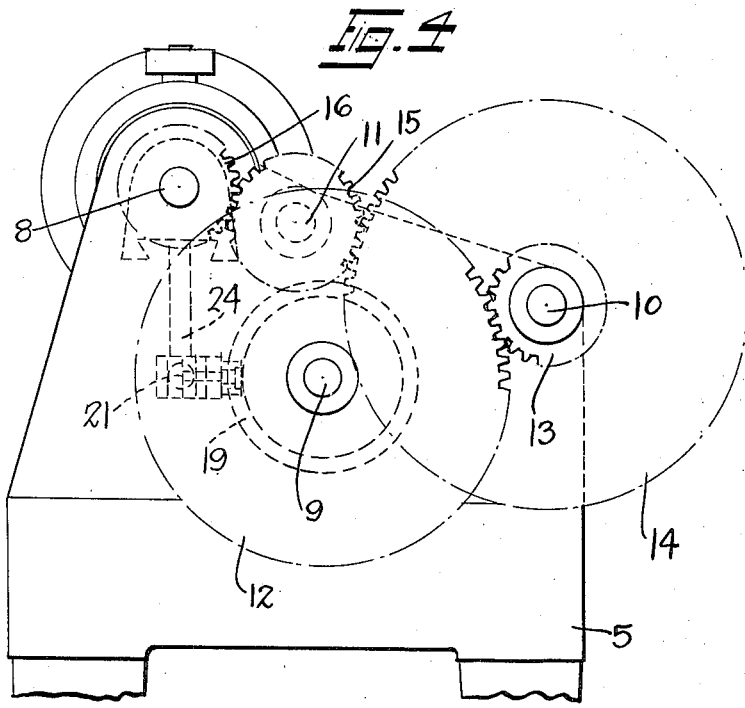
Figure 4 is an end elevation of the right hand end of the machine showing the gearing used in operating the same.
Figure 5:
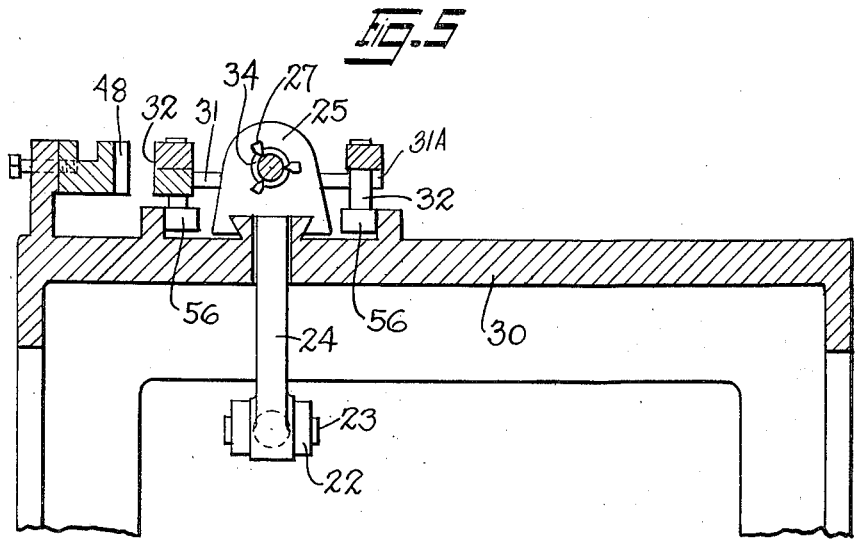
Figure 5 is a section taken on the line 5—5 of Figure 2 illustrating the mounting of the pointing device employed in connection with the screw blank.

Referring to the drawings in detail, 5 indicates the frame of the machine which is cast to provide the journal supports 6 and 7, in the latter of which are held the shafts 8, 9, 10 and 11, the shafts 8 and 9 being through shafts which are supported in the portion 6, the shaft 9 being provided at its outer end with the gear 12 which is driven by the pinion 13, see Figure 4, mounted on the stub shaft 10, there being also carried by the shaft, the gear 14 which meshes with and is driven by the gear 15 carried on the stub shaft 11. This gear 15 transmits the motion of the drive gear 16 to the gear 14 before mentioned, the drive gear 16 being mounted on the shaft 8 which carries the drive pulley 17 through the medium of which said shaft is operated. The shaft also carries a suitable clutch 18 so that operation of the pulley is possible without driving the mechanism. The gear 12 being secured on the end of the shaft 9, operates the same to revolve the cam 19 carried on said shaft, the cam being provided with a suitable cam pass 20 in which operates the roller 21 to impart to the arm or cam rod 22, the proper motion for threading and pointing the end of the screw blank. The end of the cam rod 22 is secured as at 23 to a depending member 24 which is cast integral with a pointing head 25. This pointing head has a conical opening 26 in one end thereof in which is positioned the cutters 27 which are secured therein through the medium of the set screws 28. The pointer head 25 travels on the under cut track 29 formed on the surface of the table 30 cast integral with the face 5 of the machine. The head 25 is also provided with the transversely extending arms 31 which have pivoted as at 31—A to their outer ends the tool carrying frames 32. These tool carrying frames consists of a solid cross piece 33 in which the screw blank 34 is held or rather, supported, inasmuch as this solid member or cross piece 33 slides freely along the shank 34, its sliding movement being imparted by reason of the fact that it is one of the ends of what might be termed, a tool carrier frame, the same being further composed of the side pieces 32 which are joined at their opposite ends through the medium of the coil spring 36. It is quite evident that this frame 32 will be carried with the pointing head 25 when the latter is operated by the cam 19 through the medium of the cam shaft 22 and extension 24.

Figure 7:
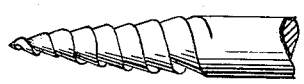
Figure 7 is a view showing the end of a double thread barbed drive single point screw which may be cut by the double tool in the machine.
Figure 8:
Figure 8 is a view of the end of the double thread speed screw of the single point type which also may be cut in my improved machine with a double tool.
Figure 9:
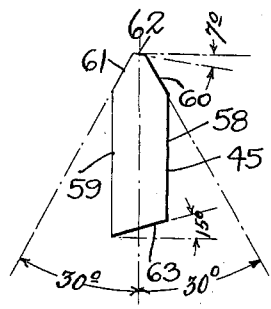
Figure 9 is an end elevation of my improved cutter illustrating the contour and shape of the tool in its cross sectional area.
Figure 10:
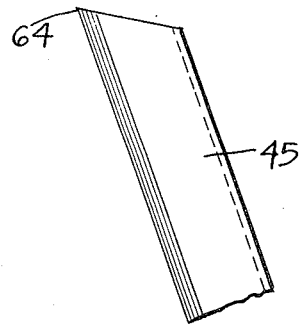
Figure 10 is a view in side elevation of the cutting tool illustrated in Figure 9.
Figure 11:
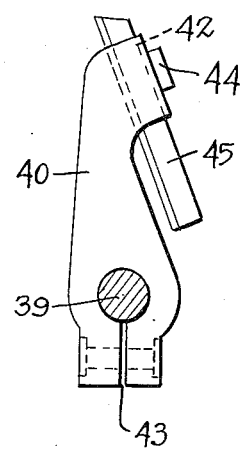
Figure 11 is a view in side elevation of the tool holder and tool employed in the machine.
Figure 12:
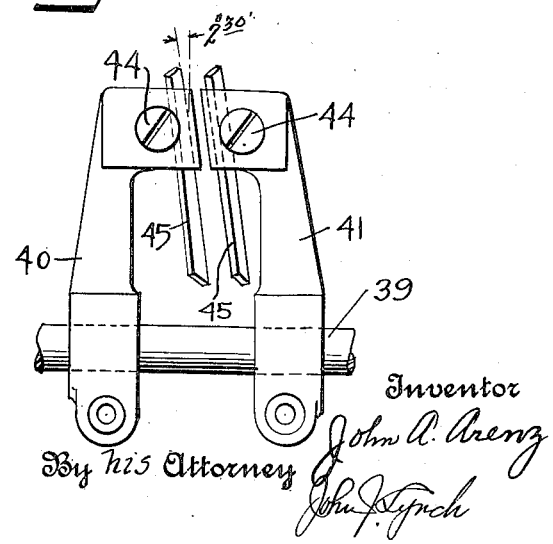
Figure 12 is a view of the tools and double tool holders taken at right angles to the view shown in Figure 11, the tools being shown in perspective and in the position they will assume during the cutting operation.

The frame piece 32 at the side nearest the operator of the machine is provided with an opening 36 in which slides the tool holder 37, this tool holder comprising the spaced arms 38 which support at their ends the shaft 39 upon which are mounted the tool holders 40 and 41. These tool holders are split in their upper and lower portions as at 42 and 43 respectively and through the medium of suitable bolts, are clamped to the shaft 39 and through the medium of the set screws 44 are pinched at their upper ends to support in proper position the cutting tools 45. It will be noted that the upper end of the tool holder 41 is turned opposite in the direction that the upper end of the tool holder 40 is, this being so in order that the tool 45 carried thereby may be disposed in exactly the same position as the tool 45 carried by the tool post 40. These tools operates upon the screw blank 34 to cut therein either type of thread as illustrated in Figures 7 and 8 and at the start of the cutting operation, for instance, both tools will operate one behind the other to cut the black thread completely down to the tip of the screw blank. When this has been accomplished, the tool head will be returned and it will cut the same thread a little deeper or until its full depth has been taken care of. The cam 19 is so cut that at a certain time the tool holder will be carried sufficiently back to enable the tool to start the cutting of the intermediate or white thread, this providing the double headed screw. It being borne in mind, however, that both of these tools travel and cut the same thread at the same time, one tool does not cut one thread and the other tool cut another thread, they both cut the same thread being disposed slightly in advance of each other to cut the thread and perfect it, it being understood that one of the tools 45 will be slightly advanced in the holder so that it will take a deeper cut during the threading operation.

The tool frame 37 or holder is provided with an extension 46 which carries a roller 47, this roller riding on the cam surface 48 which conforms substantially to the outline of the shape of the blank 34. It is quite evident that when the frame 32 is drawn back, the roller will ride up on the inclined portion of the cam 48 and the entire blank will be threaded down to the very tip. When the roller, however, rides over the end of the cam 48, the springs 38 will pull the holder back away from the blank and will cause the roller 47 to strike against the return plate 49 and the return stroke of the frame 32 will cause the roller to ride along the surface 50 until it passes out through the gate 51 which is hinged to the cam 48. A threading movement, therefore, of the frame piece 32 will cause the roller to ride up on the outside of the gate 51 thus bringing the tools toward the blank 34 and commencing the threading operation.

The cam 48 and its return portion 49 are formed as a single unit and are supported in connection with an upstanding portion 51—A through the medium of the screws 52. These screws 52, while supporting the cam piece 48, permit its adjustment relatively to the support 51 through the medium of the adjusting screw 53 provided with a suitable machine handle so that the tools can be adjusted to cut more deeply upon each succeeding return of the tool holder.

This operation can be carried out automatically in any well known manner through the use of cams, it being sufficient to note that the tools may be brought nearer the work upon each succeeding cut so that the threads can be rapidly and completely formed. The free end of the shaft 8 carries a suitable chuck head 54 in which the chuck jaws 55 operate to hold the blanks 34 in position to be operated upon.

The members 32 of the pointer head frame are provided with rollers 56 which operate against the flanges 57 formed on the table 13 to permit free operation of the frame.

It is evident that in a machine of this character that the threads of either the type shown in Figures 7 or 8 may be effectively cut with the tools and the cutting tools have a pair of parallel sides 58 and 59 with a pair of angularly disposed portions 60 and 61 disposed at an angle of 30 degrees to the longitudinal axis of the cutting tool 45, the same angular portions terminating along the sides 58 and 59 and joining the forward cutting sides 62 of the tool which is disposed at an angle of 7 degrees to the transverse axis of the cutting tool. The rear side 63 of the tool is disposed at an angle of 15 degrees to the transverse axis of the tool so that when the tool is placed in the holder, it is tilted sidewise at an angle of 15 degrees to the transverse axis of the tool and forwardly at an angle of 20 degrees to the vertical due to the angle of the tool seat which is inclined 2 and one-half degrees with respect to the transverse axis of the screw blank and which is also turned at an angle of 15 degrees to the transverse axis of said screw blank so that the forward cutting edge 64 of the tool produces with the final cut on the screw blank, the valley on the screw.

It is quite evident that the combination of two of these tools along side each other, operating in the same groove and one slightly more advanced to cutting depth than the other, will efficiently and quickly complete the cutting of a thread on the screw through the medium of the automatic operation of the machine.

It will be understood that the pointing and threading of the screw blank is performed in a single operation, the pointing being performed first and the threading afterward in a plurality of operations but with the use of two tools, the production of the screw is much faster than has heretofore been possible in method and machines commonly employed.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States patent is:—

1. A screw pointing and threading machine comprising in combination a movable slide, a cam for reciprocating said slide in a feed and return movement, a tool holder carried at one side of said slide and having an extension, a guide cam having a feed path and a return surface along both of which the extension moves, means for forcing the extension off the feed surface at the end thereof and on to said return surface and a yieldable latch gate at the end of said return surface through which the extension passes for shunting the extension on to said feed path upon a feed movement of said slide, and a plurality of threading tools carried in said tool holder and arranged to cut one thread at a time of a double threaded screw blank during a feed movement of said slide.

2. A screw pointing and threading machine comprising in combination, a movable slide, a cam for reciprocating said slide in a feed and return movement, a tool holder carried at one side of said slide and having an extension, a guide cam having a feed path and a return surface along both of which the extension moves, means for forcing the extension off the feed surface at the end thereof and on to said return surface and a yieldable latch gate at the end of said return surface through which the extension passes for shunting the extension on to said feed path upon a feed movement of the slide, a plurality of threading tools carried in said tool holder and arranged to cut one thread at a time of a double threaded screw blank during a feed movement of the slide, and means for adjusting the guide cam toward and away from the work.

In testimony whereof I have signed my name to this specification this 17th day of October, 1929.

JOHN A. ARENZ. [L. S.]